US010706736B2

(12) United States Patent
Alsanie et al.

(10) Patent No.: US 10,706,736 B2
(45) Date of Patent: Jul. 7, 2020

(54) METHOD AND SYSTEM FOR AUTOMATICALLY SCORING AN ESSAY USING PLURALITY OF LINGUISTIC LEVELS

(71) Applicant: The King Abdulaziz City for Science and Technology, Riyadh (SA)

(72) Inventors: Waleed A Alsanie, Riyadh (SA); Mohamed I Alkanhal, Riyadh (SA); Abdulaziz O Al-qabbany, Riyadh (SA); Mohammed N Alhamadi, Riyadh (SA)

(73) Assignee: THE KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 338 days.

(21) Appl. No.: 14/941,542

(22) Filed: Nov. 14, 2015

(65) Prior Publication Data

US 2017/0140659 A1  May 18, 2017

(51) Int. Cl.

| | | |
|---|---|---|
| *G09B 7/00* | (2006.01) |
| *G09B 7/02* | (2006.01) |
| *G06N 20/00* | (2019.01) |
| *G06N 20/10* | (2019.01) |
| *G06N 7/00* | (2006.01) |
| *G06N 5/02* | (2006.01) |
| *G06F 40/30* | (2020.01) |
| *G06F 40/232* | (2020.01) |
| *G06F 40/253* | (2020.01) |

(52) U.S. Cl.
CPC ............. *G09B 7/02* (2013.01); *G06F 40/232* (2020.01); *G06F 40/253* (2020.01); *G06F 40/30* (2020.01); *G06N 5/02* (2013.01); *G06N 7/005* (2013.01); *G06N 20/00* (2019.01); *G06N 20/10* (2019.01)

(58) Field of Classification Search
CPC ......... G09B 7/02; G06F 17/28; G06F 17/273; G06N 20/10; G06N 99/005
See application file for complete search history.

(56) References Cited

U.S. PATENT DOCUMENTS

| | | | |
|---|---|---|---|
| 6,181,909 B1 * | 1/2001 | Burstein | G09B 7/00 382/321 |
| 9,576,249 B2 * | 2/2017 | Madnani | G09B 7/02 |
| 2005/0027512 A1 * | 2/2005 | Waise | G06F 17/271 704/9 |
| 2006/0194183 A1 * | 8/2006 | Attali | G09B 7/02 434/322 |
| 2012/0131015 A1 * | 5/2012 | Al Badrashiny | G06F 17/273 707/748 |
| 2016/0148096 A1 * | 5/2016 | Bornea | G06F 17/277 706/55 |

* cited by examiner

*Primary Examiner* — Peter R Egloff
(74) *Attorney, Agent, or Firm* — Steven M. Shape; Dennemeyer & Associates, LLC

(57) ABSTRACT

The invention provides a method and system for automatically scoring a written essay using plurality of linguistic levels. The method and system includes an essay analysis module for analyzing each sentence of the essay written in Arabic language using a trained model. The essay analysis module utilizes the trained model for analyzing each sentence of the essay at plurality of linguistic levels and generates different scores at plurality of linguistic levels. The scores generated at plurality of linguistic levels are computed to generate a final score by using a weighted combination of the different scores.

8 Claims, 4 Drawing Sheets

METHOD AND SYSTEM FOR AUTOMATICALLY SCORING AN ESSAY USING PLURALITY OF LINGUISTIC LEVELS

FIELD OF THE INVENTION

The invention generally relates to the field of automatically evaluating essay writings. More specifically, the invention relates to a method and system for automatically scoring a written essay using a plurality of linguistic levels.

BACKGROUND OF THE INVENTION

In general, essay writing is one of a standardized test used to assess linguistic competency and knowledge of, but not limited to, a person/applicant before admitting or hiring the person/applicant in an educational institution or an organization and regular students in general or higher education. Then, the competency level of the person/application is evaluated by an expert in a particular subject. However, it is very critical to accurately or correctly reflect the person/applicant's level of skills and knowledge in the particular subject by manually evaluating the essay. In order to overcome the manual process of evaluating the essay, the knowledge of the person is assessed using multiple-choice exams conducted using machines. However, the linguistic competency and effective communication abilities of the person/applicant cannot be assessed, even though the evaluation process used to grade multiple-choice exams is easier.

Traditionally, the manual evaluation process used for grading/scoring the person/applicant mainly utilizes a holistic scoring approach. In this approach, the manual evaluator quickly reads the essay to create an overall impression and readability. This approach also considers other criteria, such as grammar, mechanics, style, organization, development, vocabulary usage and the like to grade/score the essay. Though, the holistic approach improves the evaluation performance of the manual evaluator. However, the time and efforts spent by the evaluator are more and also provides an inconsistency in grading the essay. Thus, in order to reduce the efforts of the manual evaluator, a computer based automatic essay scoring system has come into existence.

Conventional computer based automatic essay scoring methods typically require extensive data collection to build a model for grading essay responses. Such data collection limits the effectiveness of the automated essay scoring systems since only essay responses from widely administered tests may be adequately graded. Similarly, the method of automatic essay scoring can also be implemented using a specific domain corpus that includes a plurality of pre-scored essays. The plurality of pre-scored essays is compared with an essay to automatically grade/score the essay. However the time required for identifying similarity between the essay and the plurality of pre-scored essays with different topics is difficult. In addition to the plurality of pre-scored essays corpus, textbook or course materials can also be considered to evaluate the essay. However, the method of selecting a text passage from the textbooks or course materials, which is similar to the essay and measuring the distance between the text passage and the plurality of pre-scored essays is a lengthy process. Additionally, the automatic essay scoring technique utilizes the method of comparing a concept and a paragraph in the essay to identify similarity between words in the paragraph and the concept and predicts the score of the essay. However, the prediction of scores is mostly based on length of the essay which does not analyze whether content is related to the concept or not and does not classify a relationship between the concept and the paragraph in the essay. Therefore, the methods used for generating automatic scores for essays do not provide an efficient or effective method of analyzing essays, which are more specifically written in Arabic language.

In view of the above, there is a need to enhance the method and system for providing an efficient analysis for automatic scoring of essays.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
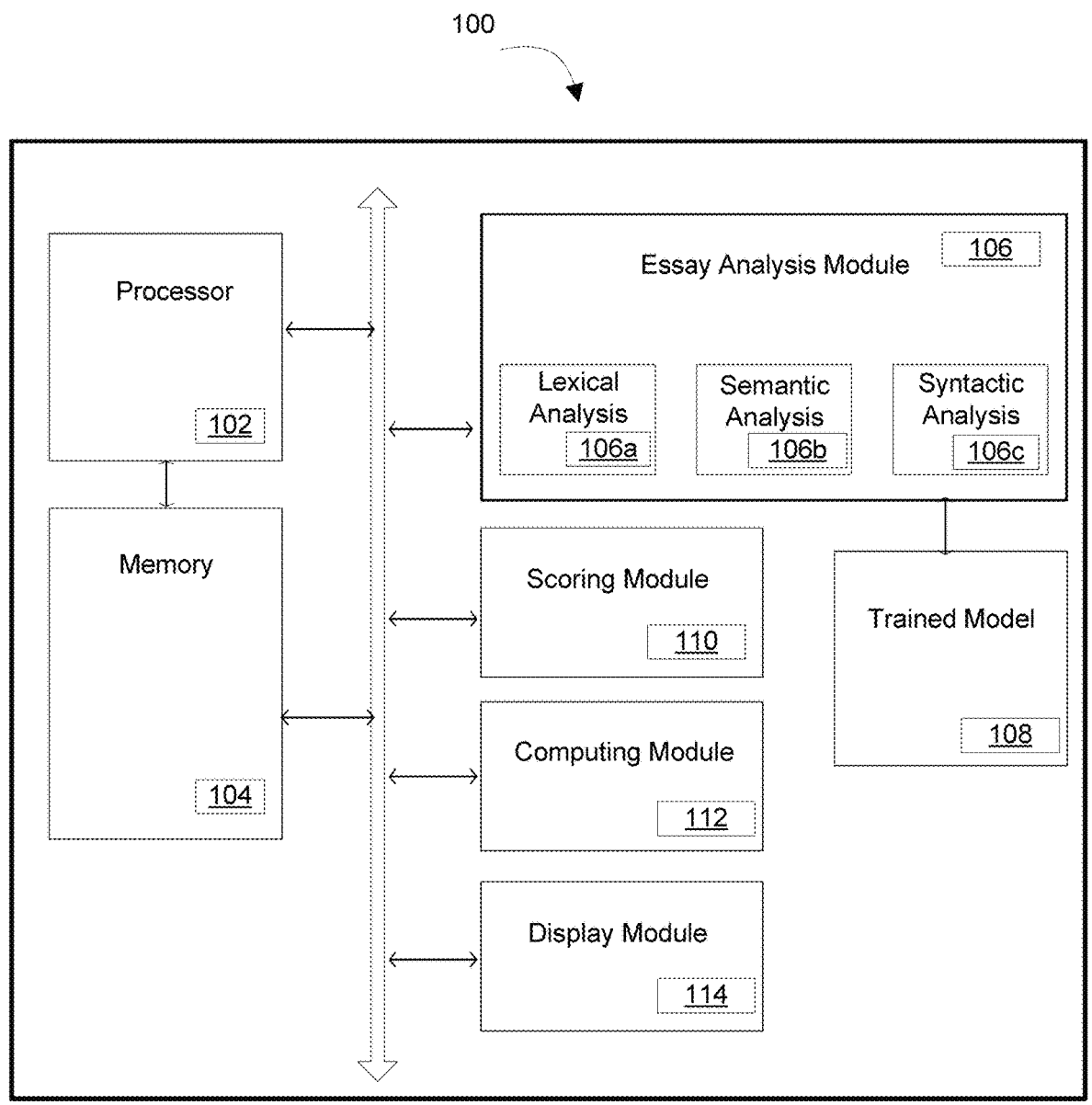
FIG. 1 illustrates a system for automatically scoring an essay written in a language in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present application.

DETAILED DESCRIPTION OF THE INVENTION

Before describing in detail embodiments that are in accordance with the invention, it should be observed that the embodiments reside primarily in combinations of method steps and system components related to automatically scoring essays written in Arabic language using plurality of linguistic levels.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for automatic scoring of an essay written in Arabic language using plurality of linguistic levels.

FIG. 1 illustrates a system 100 for automatically scoring an essay written in a language in accordance with an embodiment of the invention. As illustrated, system 100 includes a processor 102, a memory 104, an essay analysis module 106, a trained model 108, a scoring module 110, a computing module 112 and a display module 114. Essay analysis module 106, trained model 108, scoring module 110, computing module 112 and display module 114 are communicatively coupled to processor 102 and memory 104.

Essay analysis module 106 receives an essay written in a language. The language can be, but need not be limited to, Arabic language. Essay analysis module 106 is used to analyze each sentence of the essay using trained model 108. Trained model 108 communicating with the essay analysis module is a corpus of pre-evaluated essays which are evaluated using manual processes and/or automatic processes. Trained model 108 stores the pre-evaluated essays along with their respective scores for future reference for evaluation of the essays.

In accordance with the method and system, each sentence of the essay is analyzed using essay analysis module 106 at a plurality of linguistic levels. The plurality of linguistic levels of the essay can determine structure and concept of the essay written in Arabic language and generate scores in accordance with different levels of evaluation. The plurality of linguistic levels, may include, but need not be, limited to, a lexical level, a semantic level and a syntactic level. Accordingly, essay analysis module 106 includes a lexical analysis module 106a, a semantic analysis module 106b and a syntactic analysis module 106c for evaluating the essay at the plurality of linguistic levels.

In accordance with an embodiment, each sentence of the essay is analyzed at the lexical level by lexical analysis module 106a using a lexicon based spell checker that executes a spell check on each sentence of the essay. The lexicon based spell checker identifies spelling errors in each sentence of the essay and compares each sentence of the essay with similar sentences of the pre-evaluated essays in trained model 108. The lexical analysis of lexical analysis module 106a, is then, communicated to scoring module 110. Scoring module 110, then, generates a first score for the essay based on the scores of the pre-evaluated essays.

Moving on, semantic analysis module 106b analyzes each sentence of the essay at semantic level by identifying a semantic relationship between words in each sentence of the essay using trained model 108. The semantic relationship between the words can be analyzed by assessing a conceptual knowledge of the essay with the pre-evaluated essays stored in trained model 108 using Latent Semantic Analysis. The assessed data is then used by scoring module 110 to generate a second score for the essay.

Syntactic analysis model 106c analyzes each sentence of the essay at a syntactic level by generating one or more parse tree structures of the essay. The components of syntactic analysis module 106c used for performing syntactic analysis of the essay is further described in detail in conjunction with FIG. 2.

Scoring module 110, then, generates a third score for the essay based on the syntactic analysis of the essay performed by syntactic analysis module 106c.

Thereafter, a final score is computed by computing module 112 for the essay by using a weighted combination of the first score, the second score and the third score. The weights used to compute the final score are those adjusted during the training process. The computed weights from the pre-evaluated essays are stored in trained model 108 and they are used to weight the score of each linguistic level for the essay to be auto-scored.

The final score is then displayed on display module 114 of system 100.

In addition, system 100 can utilize one or more regression methods for computing a percentage of spelling mistakes, LSA and parsing performed during analysis of each sentence of the essay at the plurality of linguistic levels. The one or more regression methods may include, but need not be limited to, Linear Regression method and Least Squares Multivariate Polynomial Regression method computation involves calculating scores for the percentage of spelling, percentage of the LSA and percentage of parsing.

Figure 2:
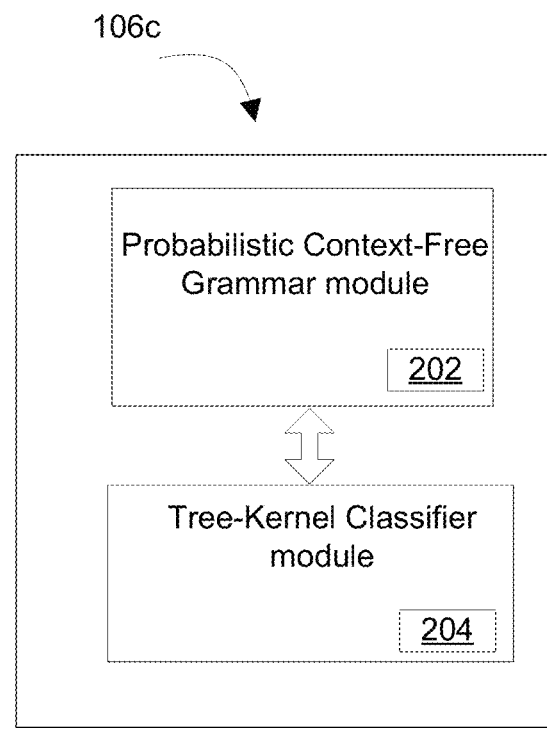
FIG. 2 illustrates components within a syntactic analysis module for scoring an essay at a syntactic level.

FIG. 2 illustrates the components within syntactic analysis module 106c for scoring the essay at the syntactic level in accordance with an embodiment of the invention.

Syntactic analysis module 106c includes a Probabilistic Context-Free Grammar (PCFG) module 202 and a tree kernel classifier module 204.

PCFG module 202 analyzes each sentence of the essay to create the one or more parse tree structures of the essay. The context-free grammar is a class of formal grammars defining formal languages. The formal grammar is a generative model, which defines a method of producing sentences in formal language. The sentences generated using the formal grammar is represented in a tree structure, which is referred as a parse-tree. Further, the context-free grammar includes a set of non-terminal symbols, a set of terminal symbols, a set of production rules and a start symbol for initiating the method of creating the sentences from the essay written in any language. Then, a probability distribution is defined over alternative choices of each production rule from the set of production rules for creating the sentences. The grammar used for creating the sentences is called as stochastic/probabilistic context-free grammar. Later, a parsing tool which may include, but need not be limited to, a Stanford parser is used to tokenize the sentences. The tokenization process is mainly used to break the sentence or text into one or more main words. The sentences tokenized can be limited to a predefined number of words. The predefined number of words, may include, but need not be limited to, 150, 160, 170 and the like. Thus, the tokenized sentences generate the one or more parse tree structures of the sentences of the essay.

The one or more parse tree structures of the essay are then assessed by tree kernel classifier module 204. Tree kernel classifier module 204 may be embedded in a support vector machine that classifies each sentence of the essay based on the structure. The support vector machine is defined as a supervised learning model associated with a learning algorithm to analyze data and recognize patterns of the data used for classification and regression analysis. The support vector machine is used to create decision boundaries for scores of the essay using support vector machine solvers. The support vector machine classifies the essay in a discrete scale, which can be range from a low value to a higher value. The range of the discrete scale may include, but need not be limited to, 1 to 6, or 1 to 10 and the like. The classification of the discrete scale is mainly implemented to overcome different binary classification methods. For instance, the discrete scale of 1 to 6 is used to classify the scores of the essays. The essays scored as 1 are labeled as positive and the essays with different scores are labeled as negative. Thus, the decision boundary is used to separate class 1 (scored as 1) essays from other class of essays using support vector machine solver. Further, the classification of essays is continued by using the discrete scale 2 to 6 to classify the essays with different scores. The essays classified with same score in one or more instances of the discrete scale are confidently labeled as positive and the other essays are labeled as negative.

Tree kernel classifier module 204, then, assesses the one or more parse tree structures of the essay using trained model 108. Thereafter, scoring module 110 generates the third score for the essay based on the scores of the pre-evaluated essays in trained model 108 by assessing the similarity level of the one or more parse tree structures of the essay with the parse tree structures of the pre-evaluated essays of trained model 108.

Figure 3:
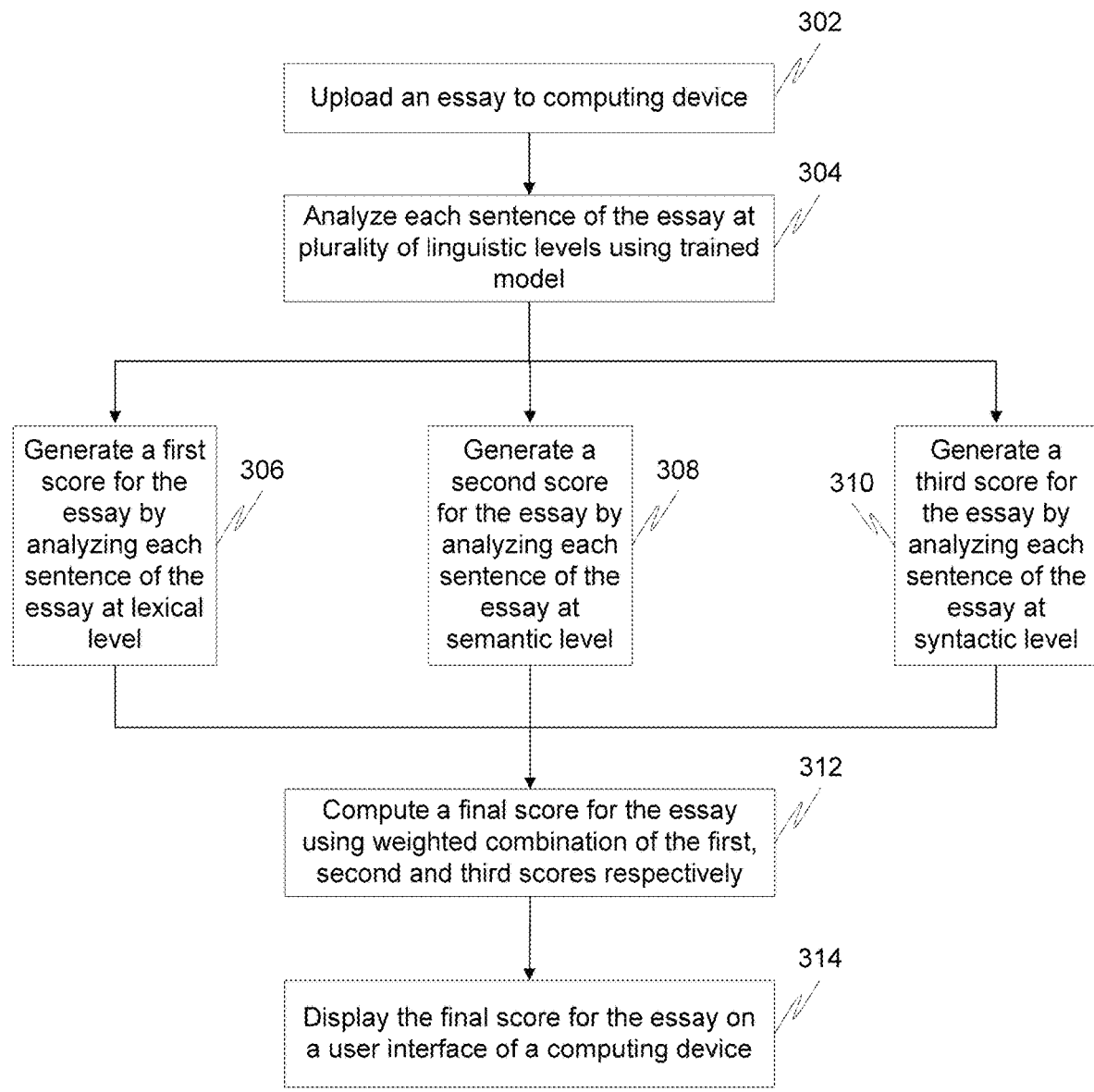
FIG. 3 illustrates a flow diagram for a method of automatically scoring an essay written in a language in accordance with an embodiment of the invention.

FIG. 3 illustrates a flow diagram for a method of automatically scoring an essay written in a language in accordance with an embodiment of the invention. An essay to be scored is uploaded at step 302 at a computing device.

At step 304, the essay is analyzed by essay analysis module 106 at a plurality of linguistic levels using trained model 108. Essay analysis module 106 is used to analyze each sentence of the essay at the plurality of linguistic levels to determine structure and concept of the essay written in Arabic language. The plurality of linguistic levels, may include, but need not be, limited to, a lexical level, a semantic level and a syntactic level are used to analyze the essay and generate scores at different levels using scoring module 110.

Thereafter, the method generates a first score for the essay by analyzing each sentence of the essay using lexical analysis module 106a at step 306. Lexical analysis module 106a is used to execute a spell check using a lexicon based spell checker for identifying spell errors in each sentence of the essay. Similarly, the method generates a second score for the essay at step 308 by analyzing each sentence of the essay using semantic analysis module 106b. Semantic analysis module 106b identifies a sematic relationship between words in each sentence of the essay using trained model 108. In a similar manner, the method generates a third score for the essay at step 310 by analyzing each sentence of the essay using syntactic level module 106c. Step 310 is further explained in detail in conjunction with FIG. 4.

Moving on at step 312, a final score is computed for the essay by using a weighted combination of the first score, the second score and the third score generated from steps 306, 308 and 310 respectively.

After computing the final score, at step 314, the final score is displayed on display module 114 of system 100.

Figure 4:
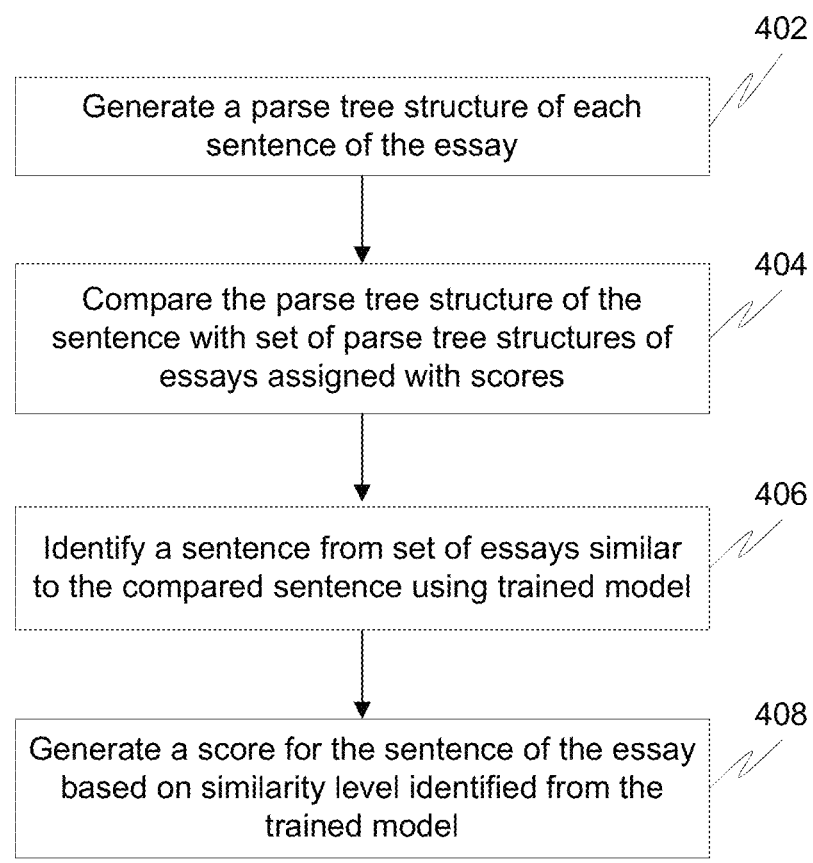
FIG. 4 illustrates a flow diagram for a method of analyzing essay at syntactic level using a tree-kernel classifier in accordance with an embodiment of the invention.

FIG. 4 illustrates a flow diagram for a method of analyzing an essay at the syntactic level using a tree-kernel classifier in accordance with an embodiment of the invention. At step 402, the method generates the parse tree structure for each sentence of the essay. The parse tree structure for each sentence of the essay can be generated using PCFG module 202. Next at step 404, the method compares the parse tree structure of each sentence of the essay with one or more parse tree structures of one or more sentences of the pre-evaluated essays with known scores stored in trained model 108.

Thereafter, the method identifies the parse tree structure of the sentence is similar to the one or more parse tree structures of one or more sentences of the pre-evaluated essays stored in trained model 108 at step 406. Then, the method generates a score for each sentence of the essay at step 408 based on the similarity levels identified at step 404 using trained model 108.

Various advantages of the method and system are to efficiently generate automatic scores to the essays written in any language and specifically for the essays written in Arabic language. The method and system used for generating automatic scores at plurality of linguistic level increases the accuracy of scoring process for the essays specifically written in Arabic language and specifically for Arabic learners as second language. Further, the method and system is used to enhance existing scoring systems by analyzing each sentence of the essay at plurality of linguistic level such as lexical level, semantic level and syntactic level.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

Those skilled in the art will realize that the above recognized advantages and other advantages described herein are merely exemplary and are not meant to be a complete rendering of all of the advantages of the various embodiments of the present application.

In the foregoing specification, specific embodiments of the present application have been described. However, one of ordinary skill in the art appreciates that various modifications and changes can be made without departing from the scope of the present application as set forth in the claims below. Accordingly, the specification is to be regarded in an illustrative rather than a restrictive sense, and all such modifications are intended to be included within the scope of the present application. The benefits, advantages, solutions to problems, and any element(s) that may cause any benefit, advantage, or solution to occur or become more pronounced are not to be construed as a critical, required, or essential features or elements of any or all the claims. The present application is defined solely by the appended claims including any amendments made during the pendency of this application and all equivalents of those claims as issued.

What is claimed is:

1. A method for scoring an essay written in a language, performed on a computing device having a processor and a memory storing a plurality of programs to be executed by the processor, wherein the essay comprises a plurality of sentences, the method comprising:

analyzing, using a trained model communicatively coupled to the processor and the memory, the trained model including a set of essays with known scores, each sentence of the essay based on a plurality of linguistic levels, wherein the plurality of linguistic levels comprises a lexical level, a semantic level and a syntactic level, wherein the trained model is trained using the set of essays with known scores;

generating a first score for the essay in response to analyzing each sentence of the essay at the lexical level, using the trained model, wherein analyzing the essay at the lexical level comprises performing a spell-check for each sentence of the essay using a lexicon based spell checker;

generating a second score for the essay in response to analyzing, using the trained model, each sentence of the essay at the semantic level, wherein analyzing the essay at the semantic level comprises performing a semantic relationship between words in each sentence of the essay;

generating a third score for the essay in response to analyzing, using the trained model, each sentence of the essay at the syntactic level using a tree kernel classifier embedded in a support vector machine, wherein analyzing the essay at the syntactic level using a tree kernel classifier comprises:
  generating a parse tree structure of each sentence of the essay;
  comparing, using the trained model, the parse tree structure of each sentence of the essay with at least one parse tree structure of at least one sentence of the set of essays with known scores; and
  generating, using the trained model, a score for each sentence of the essay based on a similarity level of the parse tree structure of each sentence with the at least one parse tree structure of the at least one sentence of the set of essays with known scores;

computing a final score for the essay be using a weighted combination of the first score, the second score and the third score; and displaying the final score for the essay on a user interface of a computing device.

2. The method of claim 1, wherein the language is Arabic.

3. The method of claim 1, wherein analyzing at the semantic level comprises assessing, using the trained model, a conceptual knowledge of the essay with the set of essays with known scores using Latent Semantic Analysis.

4. The method of claim 1, wherein a parse tree structure of each sentence of the essay is generated using Probabilistic Context-Free Grammar (PCFG).

5. A system for scoring an essay written in a language, wherein the essay comprises a plurality of sentences, the system comprising:
  a computing device including:
    a processor;
    a memory; and
    a display communicatively coupled to the processor and the memory, the computing device configured to:
  analyze, using a trained model communicatively coupled to the processor and the memory, the trained model including a set of essays with known scores, each sentence of the essay based on a plurality of linguistic levels, wherein the plurality of linguistic levels comprises a lexical level, a semantic level and a syntactic level, the essay analyzed at the syntactic level using a tree-kernel classifier, the computing device further configured to:
    generate a parse tree structure of each sentence of the essay; and
    compare, using the trained model, the parse tree structure of each sentence of the essay with at least parse tree structure of at least one sentence of the set of essays with known scores;
  generate a first score for the essay in response to analyzing each sentence of the essay at the lexical level, the first score being stored in the memory, wherein analyzing the essay at the lexical level comprises performing a spell-check for each sentence of the essay using lexicon based spell checker;
  generate a second score for the essay in response to analyzing each sentence of the essay at the semantic level, the second score being stored in the memory, wherein analyzing the essay at the semantic level comprises analyzing a semantic relationship between words in each sentence of the essay using the trained model;
  generate a third score for the essay in response to analyzing each sentence of the essay at the syntactic level using the trained model, wherein the third score is stored in the memory;
  compute a final score for the essay by using a weighted combination of the first score, the second score and the third score, wherein the final score is stored in the memory; and
  display the final score for the essay on the display.

6. The system of claim 5, wherein the language is Arabic.

7. The system of claim 5, wherein the computing device is configured to analyze the essay at the semantic level using the trained model by assessing a conceptual knowledge of the essay with the set of essays with known scores using Latent Semantic Analysis.

8. The system of claim 5, wherein the computing device is configured to generate, using the trained model, a score for each sentence of the essay based of a similarity level of the parse tree structure of each sentence with the at least one parse tree structure of the at least one sentence of the set of essays with known scores.

* * * * *